Nov. 27, 1934. E. O. HILLER 1,982,103
METHOD OF AND APPARATUS FOR MAKING PRESSED AND BLOWN HOLLOW GLASSWARE
Filed June 21, 1932 2 Sheets-Sheet 2

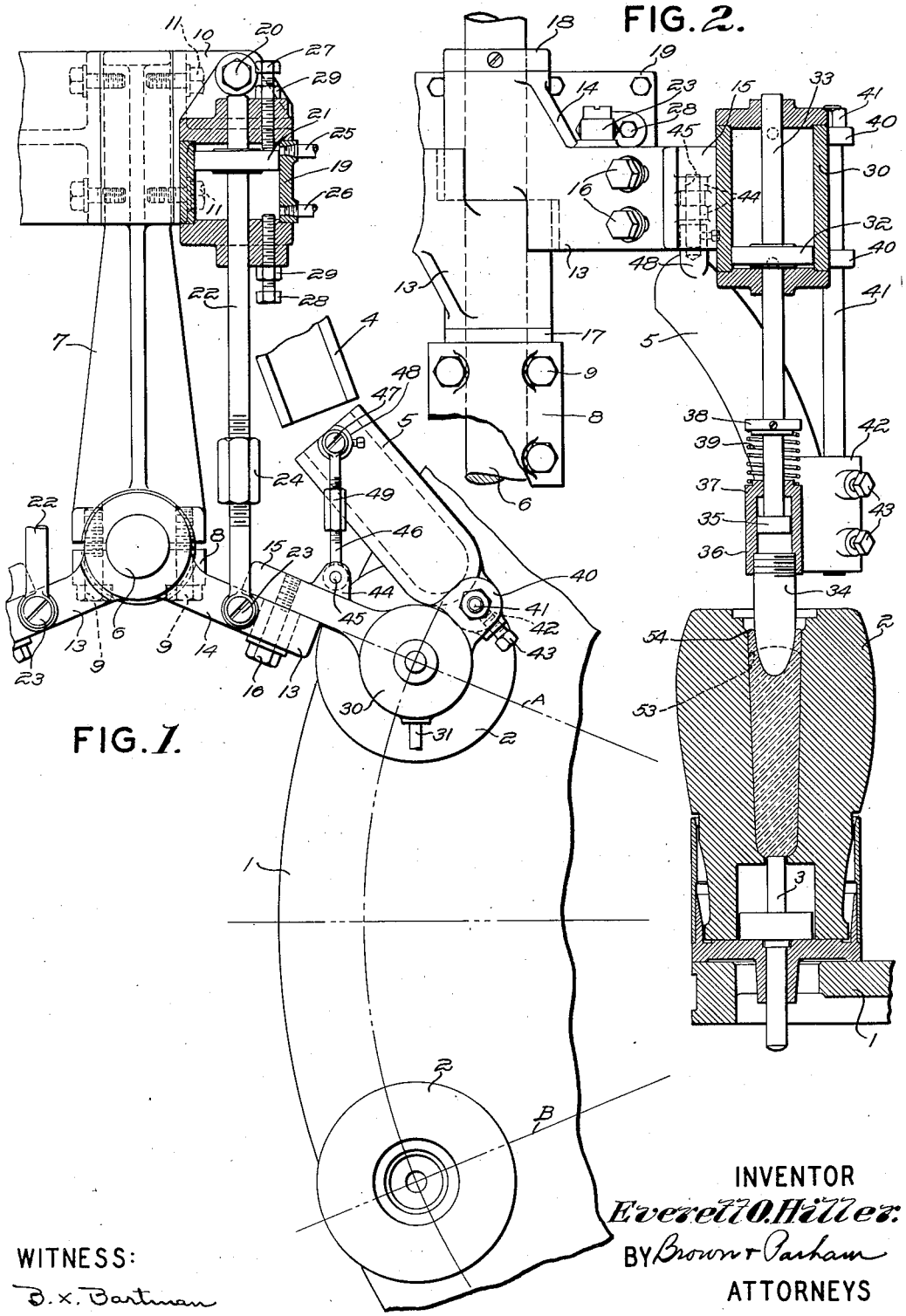

WITNESS:
B. X. Bartman

INVENTOR
Everett O. Hiller
BY Brown + Parham
ATTORNEYS

Patented Nov. 27, 1934

1,982,103

UNITED STATES PATENT OFFICE 1,982,103

METHOD OF AND APPARATUS FOR MAKING PRESSED AND BLOWN HOLLOW GLASSWARE

Everett O. Hiller, Windsor, Conn., assignor to Hartford-Empire Company, Hartford, Conn., a corporation of Delaware Application June 21, 1932, Serial No. 618,443

7 Claims. (Cl. 49—35)

This invention relates to glass pressing means, and especially to means for automatically pressing glass parisons which may thereafter be blown to the shape of the desired articles in the making of pressed and blown hollow glassware, and has to do with both the method of and apparatus for making such ware.

In the usual practice of making pressed and blown ware in the present commercial machines, a press mold used in forming a parison or partially formed article is mounted upon a rotary mold carrier which is usually, but not always, rotated intermittently. A charge of glass is supplied to such a mold in some intermittent machines, as far example, that shown in the Lorenz Patent 1,800,191, issued April 7, 1931, by an automatic feeder, and conducted therefrom to the machine by a chute system, including one or more chute sections and a curved deflector which directs the charge from the inclined chute downward into the mold, this charging usually taking place at a predetermined dwell station. As now practiced, as for example in the Lorenz patent above referred to, no positive forming operations take place upon the glass at the charging station, these operations occurring at the next and/or some subsequent station, and in some cases, between the stations as well. Thus, the glass which has been supplied to the press mold, and which does not completely fill it, is in contact with the mold walls up to the level of the top of the charge for a much longer time than the time of contact between the portions of the glass not initially in contact with the mold walls, but which are thereafter forced by the pressing operation into contact with the upper portions of the mold walls up to the line of division between the body and finish portions of the parison formed by the pressing operation. This difference in time of contact of various portions of the glass with the mold walls results in unequal thicknesses of skin or enamel. That portion of the surface of the parison having initial contact with the mold will have a materially thicker skin than that which achieved contact after the pressing operation. This will result in ultimate variation of wall thickness in the finally blown ware roughly in inverse proportion to the times of contact. It is necessary, intermediate the pressing operation and the application of the fluid pressure to blow the parison to the desired form, to provide a period of reheat during which time the body portion at least of the parison formed by the pressing operation is out of contact with any solid material which may rapidly abstract heat therefrom. The result and, in fact, the purpose of this reheat period is to permit the internal heat of the body of glass of the parison to work outwardly and soften the skin or enamel formed on the outside of the glass, so as to permit the proper expansion of the glass by the final blowing operation.

In the operation of machines of the prior art type, one or both of two undesirable results may occur. In the first place, the heavier skin or enamel on the lower portion of the parison results in an article having two different wall thicknesses: a heavier thickness formed from the expansion of that portion of the parison having the heavier skin or enamel, and a lighter wall portion adjacent to the top of the article, formed from the portion of glass which was forced into contact with the mold walls for the first time by the pressing operation, and which therefore did not have time to set to form a heavy skin. At the line of demarcation between these two portions of the completed article, there is a perceptible mark or wave in the completed article which renders it unsightly and of lesser commercial value than an article having a substantially even thickness throughout which is consequently substantially without such a wavy appearance. In the second place, during the period of reheat, which must be adequate to reheat the heavier skin portion, the lighter skin portion above referred to becomes too plastic, with the result that undue elongation of the parison may take place, this in turn resulting in an uneven final article, with uneven wall thickness as above set forth. Also, in some instances in which prior art machines may be properly adjusted, but in which charges of glass are supplied thereto in such a manner that the upper portion of the charge, after delivery to the mold, is unsymmetrical so that the mass is higher on one side than the other, there is a materially greater portion at one side than the other of the parison after formation, which has a thinner skin. During the reheating of such a parison, there may be a lateral deformation, due to the uneven stretching of the thin-skinned portions of the parison. This may later result in a completed article having non-uniform glass distribution, particularly in the lower portions thereof. Such bottles may be so bad as to be wholly unsalable.

An object of the present invention is to overcome the several difficulties above referred to by the substantial elimination of the source of these difficulties, namely, by providing a method and means for forming a parison which will have a uniform skin or enamel throughout its entire body portion. This may, and in the present instance is accomplished, by forcing downwardly the center portion of a charge of glass immediately after the supplying thereof to the mold and thereby forcing upwardly portions of the glass charge into contact with the mold walls substantially up to the line between the body and finish portions of the parison to be made.

A further object of the present invention is to provide a common supporting means for a charge directing device and a pressing device, so that pressing of a charge of glass in a press mold may take place as soon as possible after the delivery of the glass thereto. This phase of my invention is not necessarily limited to the use of preliminary pressing followed by a final pressing at a later stage of the process, but may be used in connection with a single press operation.

Further objects of my invention include the provision of suitable means for carrying out the methods above referred to and the provision of suitable adjustments in connection with these means so arranged that the means may be applied to the manufacture of a large variety of different types and sizes of articles.

Further objects and advantages of my present invention will become apparent from a reading of the following specification and sub-joined claims, when taken in connection with the accompanying drawings, in which:

Figure 1 is a plan view of a portion of a glass forming machine to which my invention has been applied, certain parts being shown in horizontal section;

Fig. 2 is an elevation with parts in vertical section, showing the operation of a portion of my device;

Figure 3:
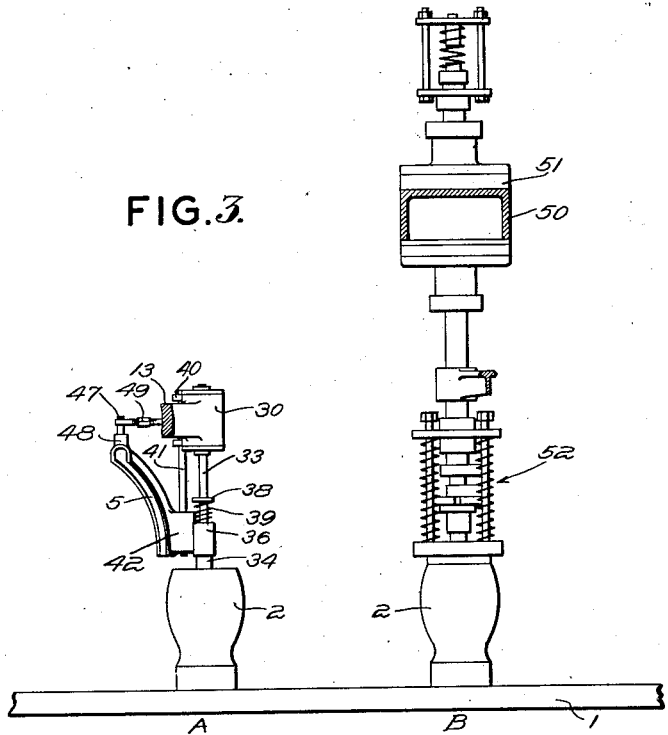
Fig. 3 is an elevation with some parts broken away and in section and other parts omitted, of a portion of a machine to which my invention has been applied, showing the relation between the preliminary pressing and the final pressing of a parison.

I have chosen to illustrate my invention as applied to a modern commercial machine now being used on a large scale in the manufacture of milk bottles, this machine being substantially that shown and described in the patent to Peiler and Lorenz, No. 1,316,550, granted Sept. 16, 1919. The machine of the Peiler et al. patent is a duplex machine, but it will be understood that my invention may equally well be applied to a single unit type of machine, such, for example, as that shown in the Lorenz patent above referred to.

Referring to the drawings, there is illustrated a mold carrier or table 1 upon which a plurality of molds 2 are mounted, these molds as shown being of the one-piece type and preferably being provided with mold valves 3, as illustrated in Fig. 2, for the purpose of assisting in the removal of parisons therefrom in a manner well known in the art. It is to be understood, however, that split molds or molds of any desired type, may be used in connection with my invention, the type shown being merely for purposes of illustration. The table 1 illustrated in the drawings is adapted to be rotated in a counterclockwise direction about a vertical axis by any suitable means, such as those shown and described in detail in the Peiler et al. patent, these means forming no part of the present invention, which in its broad aspects is applicable to a continuously rotating type of machine, as well as to one in which the mold carrier is rotated intermittently. In the machine illustrated, A represents a charging station, and B a subsequent station, here shown as the next succeeding dwell station, at which the final pressing normally takes place.

Charges of glass are supplied to the molds 2 at the position A from any suitable device, such as a commercial feeder of any type now in operation, through a chute system, including the chute 4 and deflector 5. In the present instance, the deflector 5 is mounted for movement into and out of cooperative relation with a mold 2 at the position A, in a manner hereinafter to be described.

Adjacent to station A for the molds, there is mounted upon any suitable stationary base, preferably the base of the machine, a vertical standard or post 6, to which is vertically adjustably secured a bracket 7. The bracket 7 may be secured to the standard 6 in any suitable manner and as shown is provided with a cap 8 and bolts 9 for securing it to the standard 6 while permitting it to be vertically adjusted with respect to the standard. To the bracket 7 there is shown secured a bracket 10, Fig. 4, secured thereto by bolts 11 passing through vertically elongated slots 12 in the bracket 10 and threaded into the bracket 7. This provides another point at which vertical adjustment may be had when necessary.

Pivoted loosely upon the standard 6 is a swinging bracket or support 13, which may be made in two parts 14 and 15, adjustably secured together by bolts 16 passing through horizontally elongated slots in the part 14. The support 13 carries the deflector 5 and also the preliminary pressing mechanism, hereinafter to be described.

Inasmuch as the present device is adapted for cooperation with a duplex machine, two of the supports 13 are shown pivoted independently one above the other on the standard 6, the lower one resting upon a loose collar 17, which in turn rests upon the upper face of the bracket 7 and cap 8. The supports 13 are prevented from upward movement on the standard 6 by a collar and set screw 18.

Figure 4:
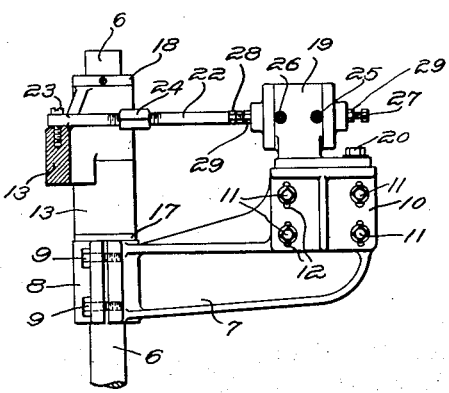
Fig. 4 is a view in elevation, with parts broken away and in section, of a portion of the actuating mechanism of the device of Fig. 1.

Means are provided for oscillating the brackets 13 between two terminal positions, such means including a fluid pressure cylinder 19, pivotally secured to the bracket 10 about a vertical axis, as indicated at 20, Figs. 1 and 4. Within the cylinder 19 is a piston 21 secured to a piston rod 22, which is pivoted to the support 13, as illustrated at 23. Means are provided for adjusting both terminal positions of the bracket 13 simultaneously and in the same direction, such means including a turnbuckle 24 having oppositely threaded portions connecting two portions of the piston rod 22. Fluid pressure may be conducted to the ends of the cylinder 19 through pipes 25 and 26 from any suitable valve and timing means (not shown). Means are also provided for adjustably determining the terminal positions of the support 13 independently of one another, such means including set screws 27 and 28, threaded through the opposite ends of the cylinder 19 and acting to limit the movement of the piston 21 in each direction respectively. These set screws may be secured in adjusted positions by jam nuts 29 threaded thereon.

A preliminary pressing means is mounted upon the support 13 and, as shown, comprises a fluid pressure cylinder 30 which may be integral with the portion 15 of the support 13, and to the opposite ends of which fluid pressure is supplied by any suitable means, preferably flexible pipes, one of which is indicated at 31, Fig. 1. The cylinder 30 is provided with a piston 32 secured to a piston rod 33, which preferably passes through both heads of the cylinder 30 and is guided thereby. It is desirable that the pressing plunger 34 at the lower end of the piston rod 33 be resiliently secured thereto, so that the pressure exerted by the plunger on the glass may be adjustably determined independently of the pressure supplied to the cylinder 30.

For this purpose, the piston rod 33 is formed with an enlarged head 35 slidingly received in a cylinder member 36, to the lower end of which the plunger 34 is removably secured. The stem of the piston rod 33 passes through the upper head 37 of the cylinder member 36 and at a point spaced therefrom has secured thereon a collar and set screw 38. Intermediate the collar and set screw 38 and the cylinder member 36 is a relatively light compression spring 39. Thus the pressure which will be exerted by the plunger 34 on the glass by downward movement of the piston 32 in the cylinder 30 may be regulated by regulating the compression of the spring 39, which in turn may be regulated by the position of the collar 38 upon the piston rod 33. The plunger 34 is made removable from the cylinder member 36 for the additional purpose of permitting interchange of plungers to suit the device to the manufacture of different articles.

Means are provided for adjustably securing the deflector 5 to the support 13, such means, in the present instance, including ears 40 extending laterally from the cylinder 30 and carrying a vertical rod 41, to the lower portion of which is adjustably secured a collar 42 which may be integral with the deflector 5. The collar 42 may be secured to the rod 41 in any desired adjusted position by set screws 43. This provides for vertical adjustment of the deflector 5, and also for angular adjustment thereof about the vertical axis of the rod 41. The portion 15 of the support 13 is also provided with vertically spaced ears 44, between which extends a short pintle 45. Upon the pintle 45 is pivoted one end of an adjustable length link 46, the other end of which is pivoted at 47 upon a vertical rod secured in a socket 48 which may be integral with the deflector 5 as illustrated in Figs. 1 and 2. The length of the link 46 may be adjusted as desired by a turnbuckle 49 connecting oppositely threaded end portions of the link. Thus, it will be seen that the deflector 5 may be adjusted vertically and angularly as desired with respect to the support 13.

Referring now to Fig. 3, there is illustrated at the position B, a suitable bracket or support 50 extending from some stationary part of the machine (not shown), on which is mounted a fluid pressure cylinder 51 which actuates a pressing mechanism, generally indicated at 52. This mechanism and its operation is conventional and is used in the final pressing of the glass to form a completed parison. The detailed description of this mechanism and its construction and operation will be found in the Peiler et al. patent above referred to, and will not be repeated herein, as it forms per se no part of the present invention.

In operation an empty mold 2 is brought to the station A by one of the intermittent rotative movements of the table 1. At this time the support 13 is in the opposite position from that shown in Fig. 1, so that the piston 21 is at the lower end of the cylinder 19 against the stop screw 28. In this position the deflector 5 is in alignment with the chute member 4 and also with the mold 2, so as to direct a charge of glass coming down the chute into the mold. With the parts so positioned, a charge of plastic glass is supplied to the mold 2. The top of the charge of glass supplied to the mold 2 may be substantially as indicated by the dotted lines 53 in Fig. 2. If preliminary pressing were not used as in prior art practice, the glass would be cooled by contact with the mold up to the juncture of this dotted line 53 with the side walls of the mold, and the glass which is thereafter forced by the single pressing operation up to the juncture between the body and finished portions of the parison, that is, substantially to the line 54, would be in contact with the walls of the mold for a much shorter time than the lower portion of the glass.

It is this relatively small portion of the walls of the parison which has a much lighter skin formed thereon than the remaining portions, and which causes the harmful results above referred to including deformation during the reheating period between the pressing and blowing of the parison and different thicknesses in the completed article with the consequent wavy appearance. According to my present invention, however, this is overcome, for immediately after the charge of glass has been supplied to the mold, pressure is supplied through the pipe 26 to the cylinder 19, and exhausted through the pipe 25, causing the support 13 to be indexed to the position shown in Fig. 1 with the plunger 34 in alignment with the cavity of the mold 2. This plunger may be shaped in any suitable or desired configuration, that shown in the accompanying drawings being solely for purposes of illustration. Also as above set forth, plungers of different configurations are used in connection with the manufacture of different articles. The plunger 34 is then forced downwardly into the glass by pressure admitted to the upper end of the cylinder 30 to force the piston rod 33 downwardly. Pressure is transmitted from the piston rod 33 to the plunger 34 through the intermediary of the compression spring 39, the effective force of which is adjusted by adjusting the position of the collar 38 upon the piston rod 33. Thus a relatively light force is applied to the top center portion of the charge of glass, forcing portions of the glass upwardly in the mold between the plunger and the side walls of the mold and substantially up to the line of division between the body and neck portions of the parisons to be made, as indicated in full lines in Fig. 2. This operation, taking place almost immediately after the supplying of the charge to the mold and followed very shortly thereafter by the withdrawal of the plunger 34, causes the glass to contact with the side walls of the mold for substantially the same time throughout the entire area of the side walls, and causes an even thickness of skin formation over the entire body portion of the parison. It is desired that the pressure applied to the glass be relatively light, and that the duration of application of pressure be short, as the purpose is not to complete the formation of a parison but merely to force the glass upwardly from the dotted line position substantially to the full line position of Fig. 2.

After this preliminary pressing operation has been completed and the plunger 34 again raised, the mold table 1 is indexed to carry the mold from the position A to the position B, at which point (or at some later point) the glass may be acted upon by suitable final pressing mechanism as indicated generally at 52 in Fig. 3, and the formation of the parison thereby completed, the parison having the usual neck finish, which may be made either in the upper portion of the single fixed mold 2, as illustrated, or in a separate and partible neck mold, as illustrated in the Lorenz patent above referred to. The parison so formed and completed may then be transferred to a suitable blow mold (not shown) and blowing pressure applied to blow it to final form according to the teaching of either the Lorenz patent, the Peiler et al. patent, both referred to above, or according to any desired practice such, for example, as those now in use in commercial art.

It is contemplated that portions of the structure herein illustrated and described as a preliminary pressing mechanism may be used to completely form a pressed article either as a completed article or as a parison which is later to be blown or otherwise formed to a desired form; that is, in which a charge directing device, such as the chute 5, and a charge pressing device, such as the plunger 34, may be mounted upon a common carrier supported in the manner shown or in any other desired manner. All such structures as come within the terms of the appended claims are to be considered within the purview of this invention.

Other changes, such for example as the use of directly applied pneumatic pressure for the preliminary pressing, may be made both in the method and apparatus of the invention within the scope of the appended claims, which are to be construed as broadly as the state of the prior art permits.

I claim:

1. The method of making pressed and blown hollow glassware, which comprises supplying a charge of glass to a stationary press mold through the open upper end thereof, forcing glass upwardly into contact with the walls of the mold substantially up to the finish portion thereof by downward pressure exerted on the center portion of the glass spaced from the side walls of the mold all while the mold remains at the position it occupied when the charge of glass was supplied thereto, moving the mold to another position, and at such other position pressing the glass to the form of a completed blank or parison for a time sufficient for the abstraction of an amount of heat from the glass such that the blank or parison thus formed is sufficiently set up that it may be transferred to a blow mold for blowing to final form.

2. The method of making pressed and blown hollow glassware with an intermittently rotatable type of machine, which comprises supplying a charge of plastic glass to a press mold of the machine at a charging dwell station for that mold, forcing a portion of the glass upwardly into contact with the side walls of the mold substantially to the line between the body and finish portions of the parison to be made by moving downwardly into the glass a plunger of smaller diameter than the upper portion of the mold while leaving unconfined in an upward direction the marginal portion of glass intermediate the plunger and the mold, thereafter moving the mold with the glass therein from the charging station to a subsequent dwell station, and pressing the glass in the mold to form the finish of the parison to be made and to complete the formation of the parison which may thereafter be transferred to a blow mold and blown to final form therein.

3. Apparatus for making pressed and blown hollow glassware, comprising a mold carrier adapted to be rotated intermittently about a vertical axis, a press mold thereon adapted to be supplied with a mold charge of plastic glass at a charging dwell station, means cooperable with said mold at said charging station subsequent to the supply of a charge of glass thereto for exerting a downward pressure upon the top center portion of the glass to force a portion of the charge of glass upwardly in the mold into contact with the sides thereof substantially to the line between the body and finish portions of the parison to be made, and means cooperable with said mold at a subsequent dwell station thereof for pressing the glass in said mold and forming a finish thereon and thereby completing the formation of a parison which may thereafter be blown to the desired shape of the article to be made.

4. Apparatus for making pressed and blown hollow glassware, comprising a mold carrier adapted to be rotated intermittently about a vertical axis, a press mold thereon adapted to be supplied with a mold charge of plastic glass at a charging dwell station, a preliminary pressing plunger mounted for substantially vertical movement into and out of cooperative relation with said press mold at said charging station for engaging and depressing the center portion only of the charge of glass in the mold and thereby forcing a portion of the glass upwardly intermediate the plunger and the mold substantially to the line between the body and finish portions of the parison to be made, and pressing means cooperable with said mold at a subsequent dwell station for pressing the glass in said mold and forming a finish thereon and thereby completing the formation of a parison which may thereafter be blown to the desired shape of the article to be made.

5. Apparatus for making pressed and blown glassware, comprising a rotatable mold carrier, a press mold thereon adapted to be supplied with a mold charge of plastic glass, means constructed and arranged to cooperate with said mold immediately after the supplying of the mold charge thereto for exerting a relative light downward pressure upon the top center portion of the glass to force a portion of the charge of glass upwardly into contact with the walls of the mold substantially to the line between the body and the finish portion of the parison to be made, means for adjustably determining the pressure applied to the glass by the last-named means, and means cooperable thereafter with said mold for exerting a heavier pressure on the glass to form a finish thereon and complete the formation of a parison which may thereafter be blown to the desired shape of the article to be made.

6. Apparatus for making pressed and blown hollow glassware, comprising a rotatable mold carrier, a press mold thereon adapted to be supplied with a mold charge of plastic glass, a support mounted for oscillatory movement into two positions relative to said mold, a mold charge-guiding device on said support and in one position of said support in cooperative relation with said mold to direct a charge of glass therein, a preliminary pressing means also mounted on said support and adapted in the other position of said support to be in alignment with said mold for exerting a relatively light downward pressure upon the top center portion only of the glass therein to force a portion of the glass upwardly into contact with the walls of said mold substantially up to the line between the body and finish portions of the parison to be made, means for moving said support relative to said mold to bring first the charge-guiding device into cooperative relation therewith for directing a charge into said mold and immediately thereafter to bring the preliminary pressing means into cooperative relation with said mold, means for actuating the preliminary pressing means, and other and distinct pressing means thereafter cooperable with said mold and the glass therein for exerting a heavier pressure upon the glass to form a finish thereon and complete the formation of a parison which may thereafter be blown to the desired shape of the article to be made.

7. Apparatus for making pressed and blown hollow glassware, comprising a mold carrier adapted to be rotated intermittently about a vertical axis, a press mold thereon adapted to be supplied with a mold charge of plastic glass at a charging dwell station, a support mounted for oscillatory movement about a vertical axis spaced from the axis of said mold carrier and adjacent to said charging station, means for oscillating said support about its axis between two terminal positions, a charge-guiding device adjustably mounted on said support for directing a charge of glass into said mold when said support is at one of its terminal positions, means for adjusting the position of said charge-guiding device with respect to said support to align it with said mold and to vary the vertical distance between it and said mold, a preliminary pressing device also mounted on said support and adapted to be positioned in alignment with said mold at the other terminal position of said support, said preliminary pressing device including a vertically disposed fluid pressure cylinder and a pressing plunger adapted to be moved vertically thereby, means for adjustably determining the pressure exerted on the glass by said pressing plunger, said plunger being so shaped and positioned with respect to said mold that it contacts with the center portion only of the charge of glass therein to force the glass in said mold into contact with the walls thereof substantially up to the line between the body and finish portions of the parison to be made, and a final pressing means including a pneumatic cylinder and glass contacting pressing means located for cooperation with said mold at a subsequent dwell station to that at which the glass charge was supplied thereto for completing the formation of a parison having a finish portion thereon, which parison may thereafter be blown to the desired shape of the article to be made.

EVERETT O. HILLER.